United States Patent Office 3,100,379
Patented Aug. 13, 1963

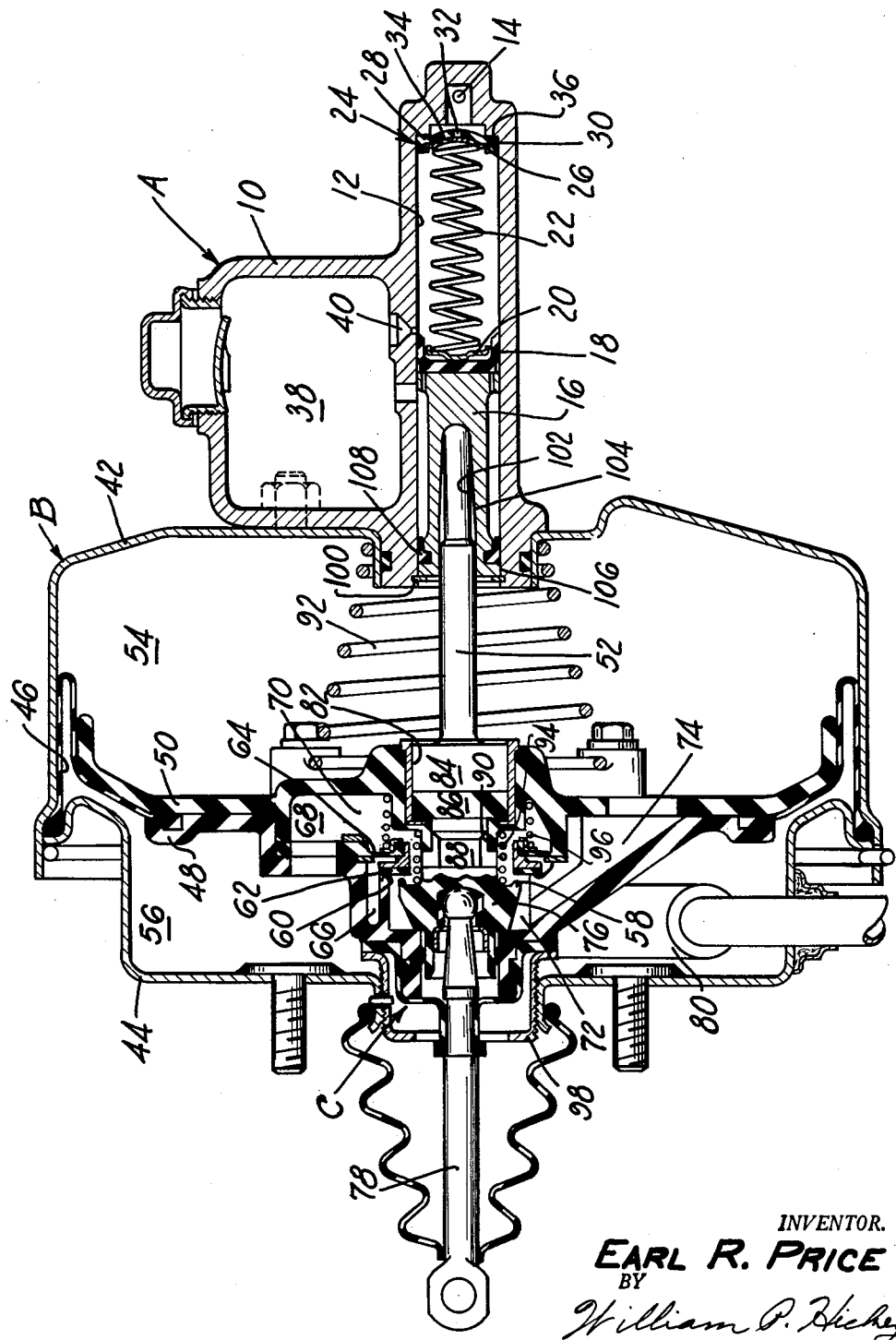

3,100,379
POWER ACTUATED MASTER CYLINDER
Earl R. Price, South Bend, Ind., assignor to The Bendix Corporation, South Bend, Ind., a corporation of Delaware
Filed Oct. 24, 1960, Ser. No. 64,459
2 Claims. (Cl. 60—54.6)

The present invention relates to power operated master cylinders; and more particularly to the type of power operated master cylinder used to actuate the hydraulic braking systems of automotive vehicles.

An object of the present invention is the provision of a new and improved construction of a power operated master cylinder which permits its servomotor unit to be disassembled from the hydraulic section of the unit without disturbing any of the hydraulic seals within the unit or in the system to which it is attached.

The invention resides in certain constructions, combinations and arrangements of parts and further objects and advantages of the invention will become apparent to those skilled in the art to which the invention relates from the following description of the preferred embodiment described with reference to the accompanying drawing forming a part of this specification, and in which:

The solitary FIGURE of the drawing is a longitudinal cross-sectional view of a power operated master cylinder of the type used to actuate the hydraulic braking system on an automotive vehicle, and which unit embodies principles of the present invention.

The power operated master cylinder shown in the drawing generally comprises a hydraulic master cylinder generally designated at A which translates mechanical movement into fluid pressure, and a fluid pressure servomotor B which is suitably affixed to one end of the hydraulic master cylinder A. The master cylinder A generally comprises a cast housing 10 having a longitudinally extending bore or chamber 12 therein from which hydraulic fluid is forced through its outlet 14 by means of a generally spool-shaped hydraulic piston 16. A hydraulic pressurizing seal is provided by the piston 16 by means of a cup-seal 18 positioned against the inner face of the piston 16 and which is held in place by means of a retaining washer 20 and a piston return spring 22. The master cylinder shown is equipped with the usual residual pressure check valve structure generally indicated at 24, which comprises a metallic disc 26 having a rubber membrane 28 stretched over its inner surface and held in place by thickened peripheral portions 30 which snap over the outer periphery of the disc 26. The membrane 28 is provided with a central opening 32 therethrough, and the disc 26 is provided with a plurality of off-set openings 34 therethrough which are normally closed off by the overlying portion of the rubber membrane. Fluid forced out of the cylinder bore 12 passes through the openings 34 to force the rubber membrane away from the surface of the disc, and then passes through its central opening 32 to the outlet 14. The inner end of the chamber 12 is provided with a step surface or shoulder 36 against which the outer periphery of the rubber membrane 28 is forced by the piston return spring 22 to provide a check valve mechanism for providing a back pressure on the fluid in the system connected to the outlet 14. Return flow through the outlet 14 causes the rubber membrane to firmly close off the openings 34 in the disc 26; so that it can only return to the chamber 12 by biasing the check valve structure 24 away from the shoulder 36 to flow around the outer periphery of the disc. The hydraulic master cylinder A further includes a reservoir of compensating fluid 38 positioned in the region overlying the bore 12. A compensating port 40 communicates the reservoir 38 with the region of the bore 12 just forwardly of the cup-seal 18; so that forward movement of the cup-seal 18 closes off the compensating port 40, and thereafter pressurizes the fluid in the inner end of the hydraulic cylinder or bore 12.

The fluid pressure motor B shown in the drawing generally comprises a stamped cup-shaped housing 42, and a removable cover plate 44 between which is sealed the outer periphery of a curtain diaphragm 46 which forms the movable wall or power piston of the unit. The radially inner end of the curtain diaphragm 46 is clamped between outer and inner diaphragm plate structures 48 and 50 which transmit mechanical force to the force transmitting rod 52 which actuates the hydraulic piston 16 of the master cylinder A. The outer diaphragm plate 48 is provided with an outwardly extending boss, and the plates 48 and 50 are cast with suitable chambers and passages therein so that together they form the control valve structure C for the servomotor.

The servomotor B, shown, is an atmosphere suspended unit in which the inner and outer power chambers 54 and 56 respectively positioned on opposite sides of the diaphragm structure are normally supplied with atmospheric pressure, and in which vacuum is communicated the inner power chamber 54 to actuate the unit. The control valve structure C generally comprises an inner movable vacuum valve seat 58 that is positioned generally concentrically inwardly of an annular vacuum valve seat 60—both of which seats face inwardly and are adapted to be closed off by a movable poppet member 62. The outer vacuum valve seat 60 is formed integrally on an inner partition in the outer diaphragm plate 48; and the poppet member 62 is affixed to and carried by a rubber diaphragm 64 which is sealingly clamped between the diaphragm plates 48 and 50 to form the vacuum valve chamber 66 of the control valve.

Atmospheric pressure is continually communicated to the outer power chamber 56 by a suitable opening, not shown, in the cover member 44; and the atmospheric pressure in chamber 56 is transmitted through the atmospheric passageway 68 to the region lying behind the diaphragm 64, and thence flows through the central opening of the poppet member 62 to the atmospheric valve seat 58. The region between the vacuum valve seat 60 and atmospheric valve seat 58 forms the control chamber 72 of the valve, and is communicated to the inner power chamber 54 through the control passageway 74. The atmospheric valve seat 58 is formed as an integral flange on the axially positioned control member 76 which is suitably guided for inward movement by the push rod 78; and the push rod 78 in turn is actuated by means of the usual brake pedal lever of an automotive vehicle.

In the position of the control valve seat shown in the drawing, atmospheric pressure flows from the outer chamber 56 through the passageway 58 and chamber 70 to the atmospheric valve seat 58. Inasmuch as the valve seat 58 is out of engagement with the poppet member 62, atmospheric pressure is free to flow past the valve seat to the control passageway 74 leading to the inner power chamber 54; thereby establishing atmospheric pressure on both sides of the movable wall of the unit. Inner movement of the push rod 78 causes the atmospheric valve seat 58 to abut the poppet 62 and thereafter close off further communication of the atmospheric pressure to the inner power chamber 54. Further inward movement of the push rod 78 causes the atmospheric valve seat 58 to lift the poppet member 62 out of engagement with the vacuum valve seat 60, and thereby communicate vacuum to the control passage 74 and inner power chamber 54. Vacuum from the manifold of the vehicle's propelling engine is continually communicated to the vacuum chamber 66 through the flexible vacuum tube 80, so that the pressure in the inner power chamber 54 is thereby reduced. Differential pressure across the movable wall causes the movable wall to move inwardly, and thereby actuate the hydraulic piston 16 of the master cylinder.

In order that a reactive force will be produced upon the push rod 78 which is generally proportional to the pressure that is developed by the master cylinder A, the inner face of the inner diaphragm plate 50 is provided with a reaction chamber 82. The inner end of the reaction chamber 82 is closed off by a cylindrical head 84 on the force transmitting rod 52, and a block of rubber like material 86 is positioned between the head 84 and the bottom of the reaction chamber 82. Force that is exerted upon the movable wall of the servomotor B is applied to the outer face of the block 86 of rubber like material to in turn pressurize the rubber and force it against the cylindrical head 84 of push rod 52. In order that a reactive force will be provided to the push rod 78, the inner end of the control member 76 is provided with a small diameter boss 88 which extends through a small opening 90 in the diaphragm plate 50 to engage the outer face of the rubber reaction disc 86. A percentage of the force applied to the rubber reaction disc 86 is therefore transmitted rearwardly to the foot of the operator.

Force applied to the force transmitting rod 52 causes the hydraulic piston 16 to move past the compensating port 50 to thereafter force fluid out of the hydraulic chamber 12 into the braking system which it actuates. When a desired effort has been achieved, inward movement of the push rod 78 is stopped by the operator; whereupon the movable wall moves inwardly a slight amount to bring the vacuum valve seat 60 again into engagement with the poppet member 62 and thereby prevent further pressure differential buildup across the movable wall. When it is desired to reduce the braking effort, the force applied to the push rod 78 is reduced; whereupon the pressure forces on the rubber reaction disc 86 forces the control member 76 rearwardly to lift the atmospheric valve seat 58 out of engagement with the poppet 62 to thereby decrease the pressure in the inner power chamber 54. The hydraulic pressure in the chamber 22 as well as the power piston return spring 92 causes the movable wall to move rearwardly and thereby follow the retractile movement of the push rod 78 until the retractile movement is stopped. Thereafter, the movable wall moves rearwardly a slight additional amount to bring the poppet member 62 into engagement with the atmospheric valve seat 58, and thereby prevent further increase in pressure in the inner power chamber 54. With the valve structure in this closed position, the brakes are held applied with a force generally proportional that developed by the servomotor B; and should it be desired to completely release the brakes, all force is removed from the push rod 78. This permits the valve return spring 94 to hold the atmospheric poppet 58 out of engagement with the poppet member 62, to thereby permit full atmospheric pressure to be obtained in the inner power chamber 54, and the movable wall to move to its fully retracted position shown in the drawing.

The diaphragm 64 for the poppet member is sized so that atmospheric to vacuum differential substantailly offsets the pressure force tending to unseat the poppet 62 from the valve seat 60, and a poppet biasing spring 96 is used to assure tight sealing engagement with the respective valve seat 60 and 58. An adjustable stop member 98 is threaded into the end cover member 44 for abutment by the movable wall to limit the retraction of the movable parts of the unit to a position wherein the lip of the seal 18 is just rearwardly of the compensating port 40.

As previously indicated it has been an object of the present invention to provide an overall power operated master cylinder construction which will be very inexpensive to manufacture and which will permit the servomotor unit to be separated from the hydraulic structure of the unit without removing or changing any of the hydraulic parts. Diaphragm type movable walls are more inexpensive to build than piston type movable walls, but they have the difficulty of not providing a support for themselves relative to the housing of the servomotor. In vacuum suspended servomotors there is provided a sealing tube which projects from the movable wall through the cover plate 44 to seal off the outer chamber 56 from the atmosphere; and so in this type of unit a suitable guide structure is of necessity provided which will permit the use of a diaphragm structure—such as the curtain diaphragm 46 shown in the drawing. Atmospheric suspended units, such as the one shown in the drawing do not have such guide structure, so that the problem of how to support a diaphragm type movable wall in an atmospheric suspended servomotor unit has existed in the art for a long time.

According to principles of applicant's invention the movable wall of the servomotor unit B is supported from the force transmitting rod 52, which in turn is made separable from the piston 16 so that the servomotor can be removed without removing the hydraulic piston 16 from the bore 12. A snap ring 100 is provided in the sidewalls of the bore 12, so that the piston 16 is prevented from being withdrawn from the bore 12 when the servomotor unit B is removed from the master cylinder A. In order that the movable wall can be supported from the hydraulic piston 16, the push rod receiving chamber 102 of the hydraulic piston 16 must be provided with a surface adjacent its outer end which tightly engages a companion surface on the force transmitting rod 52. In order that a tight sliding fit between these surfaces can be assured even though mass production methods are used, these surfaces should preferably be cylindrical so that tolerances in the length of the force transmitting rod, and the depth of the hole, will not produce a variation in the clearance between the abutting surfaces. In the preferred embodiment shown in the drawing, the outer section 104 of the chamber 102 is made cylindrical, and the force transmitting rod 52 is provided with a corresponding cylindrical surface, so that it will have a close sliding fit in the outer end of the chamber 102. The inner end of the force transmitting rod 52 is made of a reduced diameter and the inner end of the hole 102 is made slightly tapered so that the inner end of the force transmitting rod 52 is closely engaged by the inner end of the chamber 102. In the embodiment shown in the drawing, the inner ends of the chamber 102 and force transmitting rod 52 are made spherical. It will therefore be seen that the force transmitting rod 52 is tightly engaged by the piston 16 at spaced points so that it adequately supports the movable element of the servomotor unit B. Applicant is aware that spool-shaped hydraulic pistons have been used in master cylinders before; but these spool-shaped pistons have never had a load cantilevered and supported therefrom. All of the prior art spool-shaped pistons with which I am aware have had insufficient bearing area 106 outwardly of their secondary seal 108 to adequately support a cantilever load. By providing an adequate bearing area 106 in the region generally overlying the cylindrical surface 104 it has been found that the movable wall structure of a servomotor can be satisfactorily cantilevered from a spool-shaped hydraulic piston in the hydraulic chamber of a master cylinder.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. A power operated master cylinder construction comprising: a master cylinder housing having an axially extending fluid pressurizing chamber opening into an outer end surface of said housing, a longitudinally extending piston positioned in said chamber, said piston having peripheral surfaces adjacent its opposite ends which slidingly abut the sidewalls of said chamber, said piston also having an axially extending opening communicating with the outer end of said piston and the sidewalls of said opening being cylindrical adjacent the outer end of said opening, a servomotor having a housing which is axially aligned and fastened to said outer end of said master cylinder housing, a force transmitting rod having an inner end in abutment with the inner end of said opening in said piston and a spaced cylindrical peripheral surface engaging said cylindrical surface of said opening adjacent said outer end of said opening, and a flexible movable wall in said servomotor supported relative to said fluid pressure motor housing by said force transmitting rod, whereby said fluid pressure motor can be removed from said master cylinder housing without breaking the seal of said piston in said fluid pressurizing chamber.

2. A power operated master cylinder construction comprising: a master cylinder housing having an axially extending fluid pressurizing chamber opening into an outer end surface of said housing, a longitudinally extending piston positioned in said chamber, said piston having peripheral surfaces adjacent its opposite ends which slidingly abut the sidewalls of said chamber, said piston also having an axially extending opening communicating with the outer end of said piston and the sidewalls of said opening being cylindrical adjacent the outer end of said opening, a servomotor having a housing which is axially aligned and fastened to said outer end of said master cylinder housing, a force transmitting rod having an inner end in abutment with the inner end of said opening in said piston and a spaced cylindrical peripheral surface engaging said cylindrical surface of said opening adjacent said outer end of said opening, a diaphragm type movable wall in said fluid pressure motor supported relative to said servomotor housing by said force transmitting rod, and stop means preventing removal of said piston from said fluid pressurizing chamber, whereby said fluid pressure motor can be removed from said master cylinder housing without breaking the seal of said piston in said fluid pressurizing chamber.

References Cited in the file of this patent
UNITED STATES PATENTS

| | | |
|---|---|---|
| 2,373,272 | Stelzer | Apr. 10, 1945 |
| 2,968,155 | Kellogg et al. | Jan. 17, 1961 |
| 3,016,880 | Kellogg et al. | Jan. 16, 1962 |